(12) United States Patent
Greene

(10) Patent No.: US 7,540,143 B1
(45) Date of Patent: Jun. 2, 2009

(54) BOILER AND PRESSURE BALLS MONOPROPELLANT THERMAL ROCKET ENGINE

(75) Inventor: William D. Greene, Huntsville, AL (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 530 days.

(21) Appl. No.: 11/172,665

(22) Filed: Jun. 30, 2005

(51) Int. Cl.
*F03H 1/00* (2006.01)

(52) U.S. Cl. .................................................. 60/203.1

(58) Field of Classification Search ................ 60/203.1, 60/204–206, 257–259, 200.1, 39.462, 218
See application file for complete search history.

(56) References Cited

U.S. PATENT DOCUMENTS

| | | | |
|---|---|---|---|
| 3,213,804 A | 10/1965 | Sobey | |
| 3,399,534 A * | 9/1968 | Hunter et al. | 376/319 |
| 3,597,923 A * | 8/1971 | Simon | 60/260 |
| 5,205,722 A | 4/1993 | Hammond | |
| 5,251,852 A * | 10/1993 | Pulkowski et al. | 244/135 C |
| 5,368,451 A | 11/1994 | Hammond | |
| 5,862,670 A * | 1/1999 | Lak | 62/7 |
| 6,113,035 A * | 9/2000 | Hubert | 244/169 |
| 6,135,393 A * | 10/2000 | Sackheim et al. | 244/169 |
| 6,237,542 B1 * | 5/2001 | Nakajo et al. | 122/7 R |
| 6,314,978 B1 | 11/2001 | Lanning et al. | |
| 6,499,288 B1 | 12/2002 | Knight | |
| 6,499,303 B1 * | 12/2002 | Polukort et al. | 60/775 |
| 6,532,750 B1 | 3/2003 | Hood | |
| 6,623,248 B1 | 9/2003 | Dusemund et al. | |

\* cited by examiner

*Primary Examiner*—Michael Cuff
*Assistant Examiner*—Andrew Nguyen
(74) *Attorney, Agent, or Firm*—James J. McGroary; Anthony P. Venturino

(57) ABSTRACT

The proposed technology is a rocket engine cycle utilizing as the propulsive fluid a low molecular weight, cryogenic fluid, typically liquid hydrogen, pressure driven, heated, and expelled through a nozzle to generate high velocity and high specific impulse discharge gas. The proposed technology feeds the propellant through the engine cycle without the use of a separate pressurization fluid and without the use of turbomachinery. Advantages of the proposed technology are found in those elements of state-of-the-art systems that it avoids. It does not require a separate pressurization fluid or a thick-walled primary propellant tank as is typically required for a classical pressure-fed system. Further, it does not require the acceptance of intrinsic reliability risks associated with the use of turbomachinery.

13 Claims, 8 Drawing Sheets

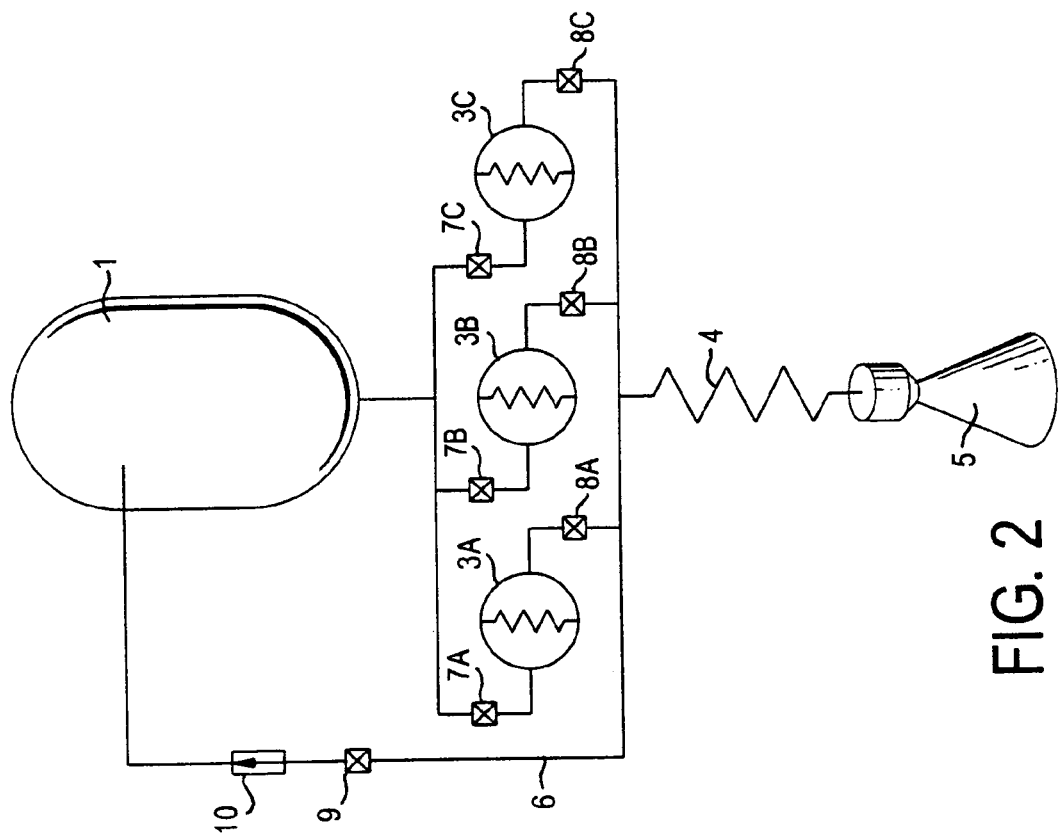
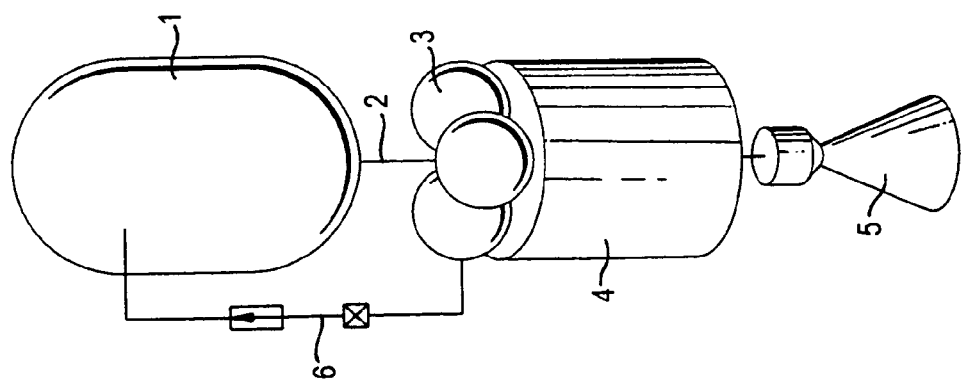
FIG. 2
FIG. 1

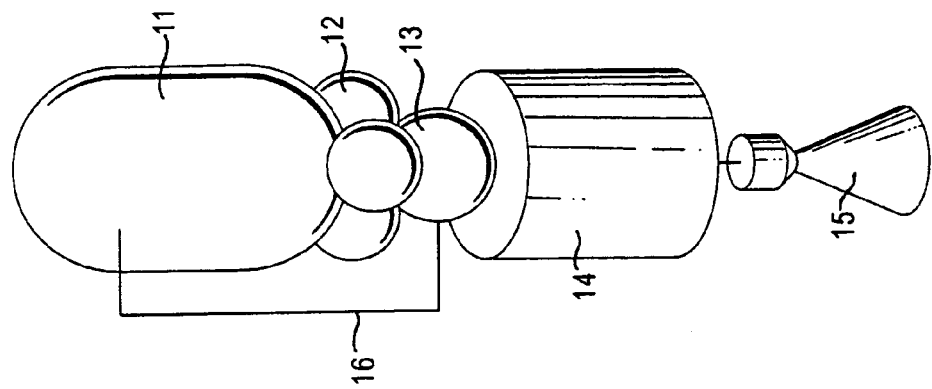
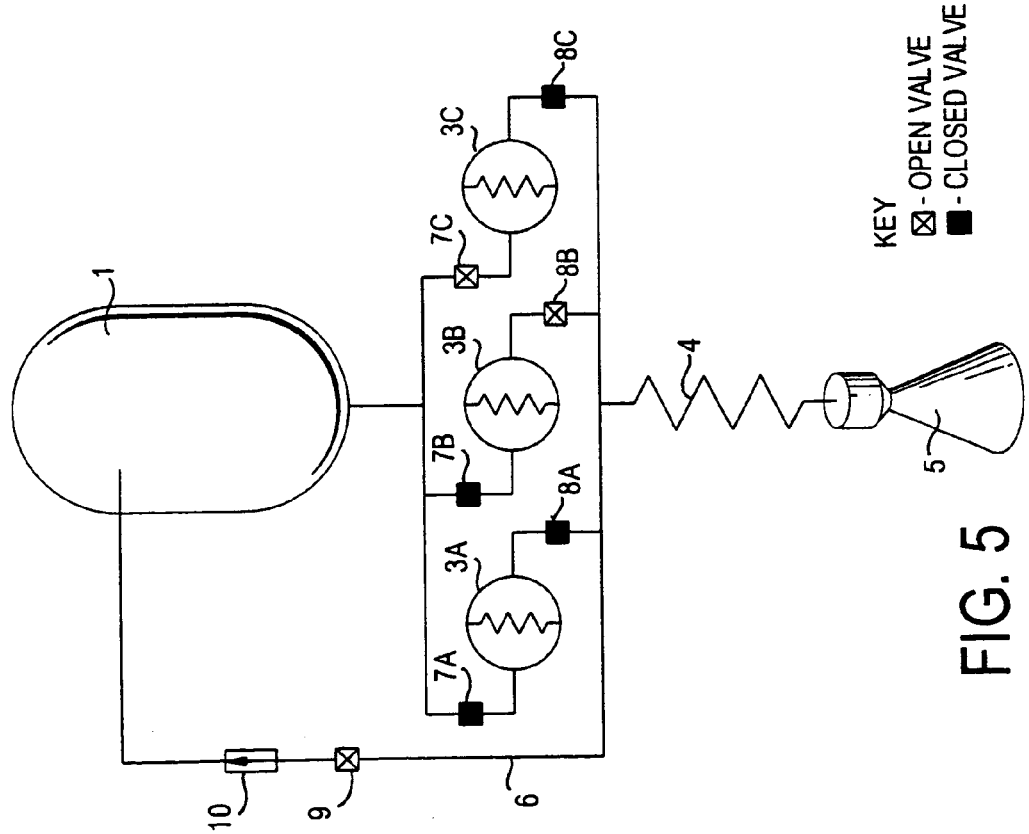
FIG. 6
FIG. 5

BOILER AND PRESSURE BALLS MONOPROPELLANT THERMAL ROCKET ENGINE

ORIGIN OF THE INVENTION

This invention was made by an employee of the United States Government and may be manufactured and used by or for the Government for Governmental purposes without the payment of royalties.

BACKGROUND OF THE INVENTION

1. Field of the Invention

This invention relates a rocket engine cycle that generates high velocity and high specific impulse discharge gas with a fluid such as liquid hydrogen.

2. Background

Liquid propellant rockets can traditionally classified into two families, pressure-fed and pump-fed. There are advantages and disadvantages to both families Pressure-fed engines require that a pressurizing fluid be used to maintain pressure in the primary propellant tank as the fluid is drained. To operate such a system at sufficient pressures and flow rates, the pressure in the primary propellant tank must be high. This mandates thick-wall construction and consequently, for large systems, very heavy propellant tanks. Thus, this is a simple design but is often limited in size for practical application.

Pump-fed engines avoid the need for thick-walled propellant tanks and, sometimes, the necessity for separate pressurization systems. In this configuration propellant from a low-pressure propellant tank is fed into a pump in which its pressure is raised thereby feeding it through the rest of the system. One problem with such a system is the need for a system to power and drive the pump. Also, there are intrinsic reliability issues with regards to all rotating machinery particularly if expected to operate for long periods and at high rotational speed.

What is desired is a rocket system that has the features of simplicity associated with the pressure-fed system with the compactness and lighter weight associated with a pump-fed system.

The standard rocketry literature is rife with examples of nuclear thermal rocket engine cycles. Additionally, a number of U.S. Patents exist for both nuclear thermal rocket engine cycles and, in a related vein, for solar thermal rocket engine cycles, such as U.S. Pat. Nos. 6,412,274; 6,343,464; 6,290,185; 5,873,239; 5,636,512; 5,475,722; 5,410,578; 4,246,751; 4,147,590; 3,820,325; 3,817,029; 3,793,832; 3,778,344; 3,336,749; 3,286,468; 3,168,807; 3,150,054; 3,108,054; and 2,917,443, each of which is hereby incorporated by reference in its entirety. There also exist a number of U.S. Patents in the area of innovative pressurization schemes for rocket engine application, such as U.S. Pat. Nos. 6,499,288; 6,314,978; 5,531,067; 5,251,852; 5,207,399; 5,205,722; 4,880,185; 3,672,165; 3,213,804; and 3,136,121, each of which is hereby incorporated by reference in its entirety.

A conventional system is disclosed by U.S. Pat. No. 6,499,288 (herein incorporated by reference in its entirety). Therein, is included a pressurizer for pressurizing a fluid, comprising a pressurant entrance for the introduction of a pressurant, a fluid entrance for the fluid, a fluid exit for the fluid, and a transfer chamber movable in a cycle with respect to the fluid exit, where for a portion of a cycle the pressurant exerts a force on the fluid inside the transfer chamber. In a preferred aspect of the disclosure, the pressurizer further comprises a spindle housing more than one transfer chamber, rotatable about an axis between the fluid entrance and the fluid exit. In another preferred aspect, the transfer chamber comprises either a flexible membrane or a movable piston to separate the pressurant and the fluid. In another preferred aspect, the pressurizer further comprises a pressurant exit for a pressurant exhaust. In preferred aspect disclosed therein, the pressurant exhaust is exhausted in a direction substantially opposite a direction of motion of the transfer chamber. In another preferred aspect, the pressurizer further comprises a motor to move said transfer chamber. In another preferred aspect, a cross section of the pressurant entrance is larger than a cross section of the fluid exit, and a cross section of the pressurant exit is larger than a cross section of the fluid entrance. In another preferred aspect, a cross section of the fluid entrance is greater than a cross section of the fluid exit.

The rocket engine system of this reference includes a pressurant, a pressurant container, a propellant, a propellant container, a rocket engine, and a transfer chamber movable in a cycle with respect to the rocket engine, where for a portion of a cycle the pressurant exerts a force on the propellant inside the transfer chamber. In a preferred aspect, for a portion of a cycle a bouyant force causes the propellant to flow into, and the pressurant to flow out of, the transfer chamber. In another preferred aspect, the rocket engine system further comprises a heating means for heating the pressurant, where the heating means comprises a heat conductor for conducting heat from the rocket engine to the pressurant. In another preferred aspect, a pressurant exhaust exerts a force on the propellant inside the propellant container. In another preferred aspect, the propellant comprises an oxidizer and a fuel. In another preferred aspect, the rocket engine system further comprises an engine conduit between the transfer chamber and the engine and a propellant conduit between the transfer chamber and the propellant container, where a cross section of the propellant conduit is greater than a cross section of the engine conduit. However, in this type of system the pressurizing fluid is stored, high-pressure gas, in contrast to the present invention.

SUMMARY OF THE INVENTION

The proposed new technology is a rocket engine cycle utilizing as the propulsive fluid a low molecular weight, cryogenic fluid, typically liquid hydrogen, pressure driven, heated, and expelled through a nozzle to generate high velocity and high specific impulse discharge gas. This much is common state of the art for in-space propulsion concepts such as nuclear thermal rocketry as available in the standard literature. A distinction of the proposed technology over the state of the art is that it incorporates a means of feeding the propellant through the engine cycle without the use of a separate pressurization fluid and without the use of turbomachinery.

Advantages of the proposed innovation are found in those elements of state-of-the-art systems that it avoids. It does not require a separate pressurization fluid or a thick-walled primary propellant tank as is typically required for a classical pressure-fed system. Further, it does not require the acceptance of intrinsic reliability risks associated with the use of turbomachinery.

Novel features of this technology disclosure include the design of a thermal rocket cycle that does not utilize either a secondary pressuring gas or a mechanical pump arrangement in order to drive the propellant through the system and generate thrust. Such a design has the potential of resulting in a system that is lower in weight and higher in reliability than previously proposed thermal rocket cycles.

With regard to analysis of this proposed cycle, various analyses of other thermal cycles exist in the literature, though not of this specific concept. Consistent with these analyses, the inventors expect this system would generate specific impulse values much greater than conventional, bipropellant chemical combustion cycles.

BRIEF DESCRIPTION OF THE DRAWINGS

FIG. 1 shows a general layout of a first embodiment of the invention.

FIG. 2 is a schematic layout of the embodiment of FIG. 1.

FIG. 5 is a schematic of a third operational phase of the embodiment of FIG. 1.

FIG. 6 shows a general layout of a second embodiment of the invention.

DETAILED DESCRIPTION

Figure 4:
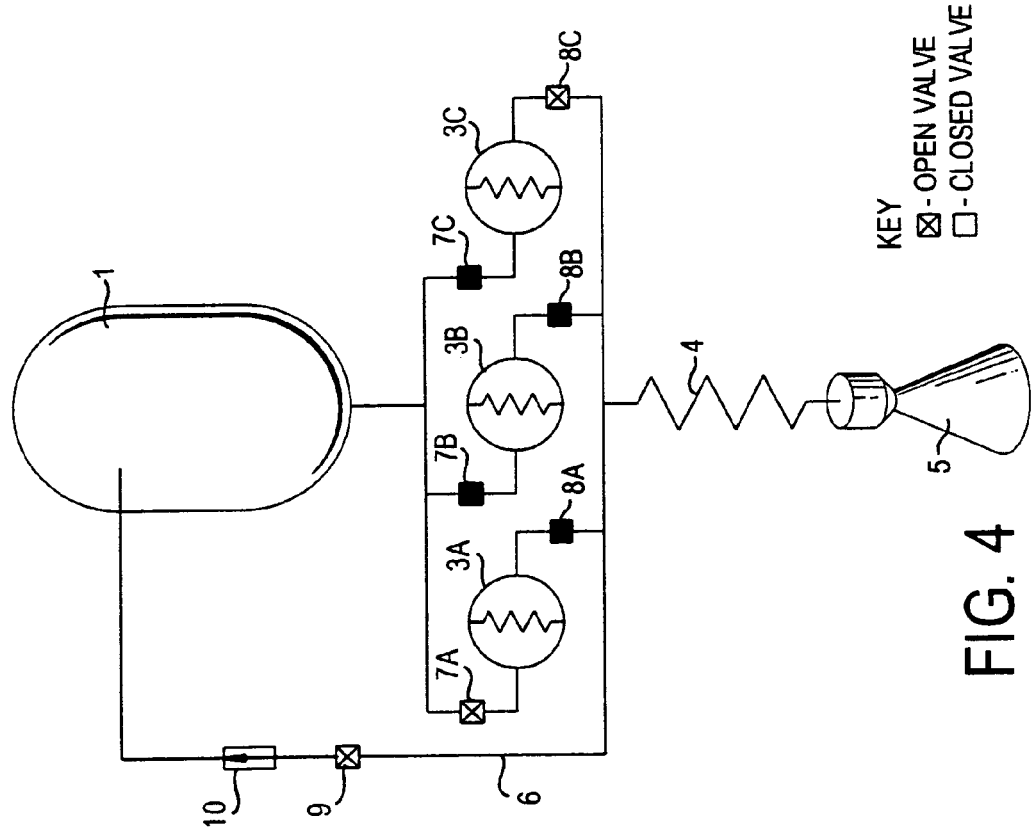
FIG. 4 is a schematic of a second operational phase of the embodiment of FIG. 1.

Typically, this system is pictured functioning in coordination with a nuclear fission reactor. This is one implementation of the design. Another could be implementation within a solar-thermal propulsion system architecture.

FIG. 1 shows a general layout of an embodiment of the invention. Propellant is stored in the propellant tank 1 at a relatively low pressure. This propellant is preferably a cryogenic liquid form of a low molecular weight fluid, such as hydrogen. Propellant is fed into the system through a feedline 2. Pressure balls 3 are a series of small, thick-walled tanks, capable of high pressure and thermally connected to the fission reactor. In a preferred embodiment, short heat-pipes are used for the connection and the inclusion of additional heat energy carrying structure within these pressure balls to enhance heat transfer.

Fission reactor 4 is the reactor itself, which may be cooled, both by via the heat extraction via the pressure balls and by direct convection of gas flow through the reactor 4. Exhaust nozzle 5 is used to discharge the hot gases to generate thrust, and pressurization line 6 is intended to maintain pressure in the primary propellant tank in an autogenous manner.

Figure 3:
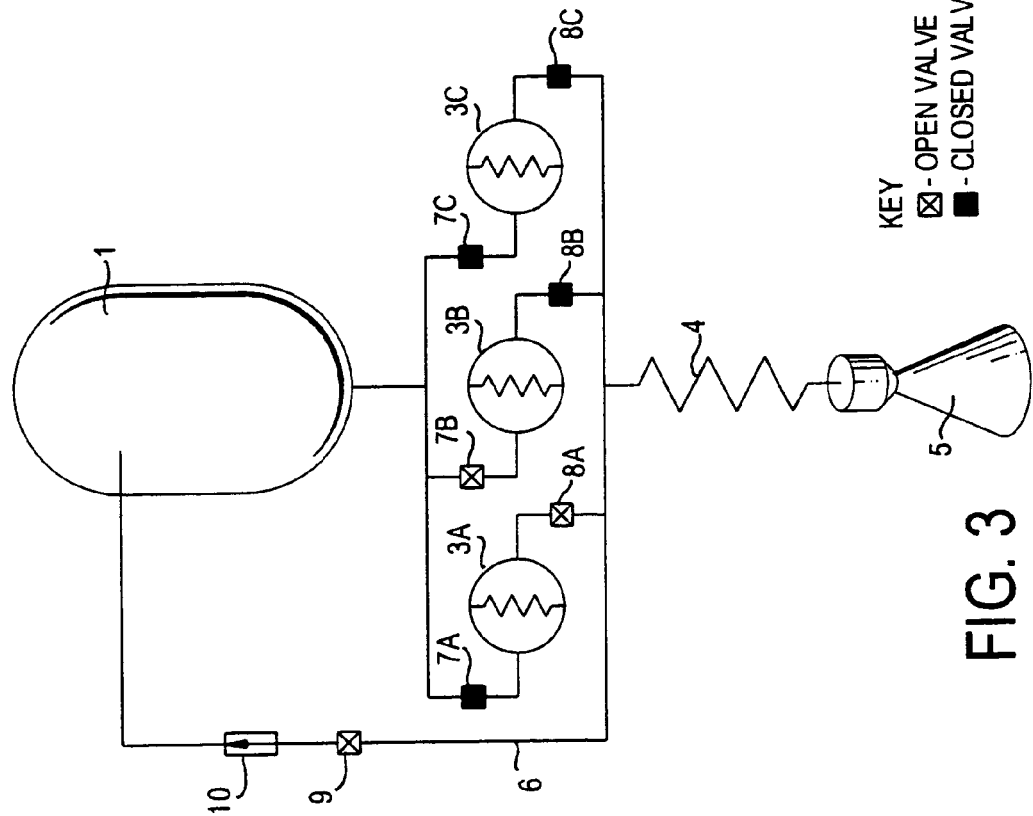
FIG. 3 is a schematic of a first operational phase of the embodiment of FIG. 1.

FIG. 2 shows the same components as in FIG. 1 laid out in schematic format with the addition of six on/off control valves. The three pressure balls 3 are labeled A, B, and C. The inlet and outlet valves associated with the three pressure balls A, B, C are labelled 7A-C and 8A-C, respectively. Additionally, FIGS. 3, 4, and 5 show the operational phases of this embodiment. These three figures show how the system operates in a cyclical manner to achieve an effective pumping action via the use of heat transfer in the pressure bottles (pressure balls). The phases shown here are notional in that it is likely there may be intermediary phases since the actions of filling and draining the pressure balls may not be equal. It would likely be desirable to ensure that the system downstream of the pressure balls is maintained at supercritical pressures to sidestep the difficulties that are associated with fluid phase change. In all cases, however, the final action of the propellant fluid is preferably to pass through the reactor core to gain a significant quantity of heat. This thermal energy can then be transformed into kinetic energy and thrust via the exhaust nozzle. Further, through all phases of operation, a valve in an autogenous pressurization line, shown at 9 in FIG. 2, is typically modulated by modulator 10 to maintain the proper low pressure in the primary propellant tank 1, and feeds the outlet valves 8A-C back to propellant tank 1.

FIG. 3 shows operational stage 1, in which pressure ball A is used for thrust, while pressure ball B is used for recharge and pressure ball C is used for pressurization. This is accomplished by opening only inlet valve 7B, while ensuring inlet valves 7A and 7C remain closed, and while only outlet valve 8A is open, and outlet valves 8B and 8C remain closed.

FIG. 4 shows operational stage 2, in which pressure ball 3A is used for recharge, pressure ball 3B is used for pressurization and pressure ball 3C is used for thrust. This is accomplished by opening only inlet valve 7A and outlet valve 8C (with inlet valves 7B and 7C and outlet valves 8A and 8B remaining closed).

Similarly, FIG. 5 shows operational stage 3, in which pressure ball 3A is used for pressurization, pressure ball 3B is used for thrust and pressure ball 3C is used for recharge purposes. This is accomplished by opening inlet valve 7C and outlet valve 8B (while inlet valves 7A and 7B and outlet valves 8A and 8C remain closed).

Table 1 shows the various valve positions, and the resulting function of the respective pressure ball:

TABLE I

| Inlet Valve 7 | Outlet Valve 8 | Resulting Function |
| --- | --- | --- |
| OPEN | CLOSED | Recharge |
| CLOSED | CLOSED | Pressurize |
| CLOSED | OPEN | Thrust |

As shown in Table I, at least one of the inlet valve 7 and outlet valve 8 is closed. In order to avoid a catastrophic result, a check valve (not shown) can be incorporated to avoid backflow up the feedline 2. For example, such a check valve may be included only as a safety measure, should both the inlet valve 7 and outlet valve 8 unintentionally close.

The various valve positions result in the different operational phases due to heat transfer. The propellant comes in as low-pressure liquid, gets heated while the ball is locked up (both valves closed) thereby pressurizing the fluid, and then the pressure is released by blasting the fluid into the reactor. It is this pressure increase which drives the whole cyclical phasing of the inflow-pressurization-outflow and simulates a pumping activity, but without an actual rotating pump.

One objective of the invention is to simulate as much as possible a non-modulating, constant flow. In other words, the invention functions like a turbopump feeding the system. Thus, the cycles of the balls are brought as close together as possible.

It is also considered within the scope of the invention to use more than three balls and thereby have the various cycles overlay each other. However, such is not a preferred embodiment, as the operational aspects of this might become even more daunting, and with the addition of every ball additional weight for both the ball and the valves and the actuation system for those valves must be considered.

Although the function of the various pressure balls is determined by the position of the various valves, the particular location of each functioning pressure ball is not important. For example, if the respective valves were switched such that the function of two pressure balls were swapped, the function would remain the same. It only matters in that the end result must be that the modulating flow approaches smooth flow. That is why there are three balls mirroring three cycles. In this one ball will be in each mode and, continuously, one ball feeds the reactor.

Although the preferred embodiment includes three equal sized pressure balls 3, wherein one is used for pressurization, one for thrust and a third for recharge, it is within the scope of the invention to vary the number and shape of the various pressure balls 3 to achieve different results.

FIG. 6 shows a general layout of a second embodiment of the invention, wherein the number of valves is greatly increased. Propellant is stored in a propellant tank 11 at a relatively low pressure. This embodiment includes a series of three thick-walled spherical tanks 12 called here "Pressure Balls." A boiler 13 is thermally connected to a reactor core (not shown) by any conventional method/apparatus. Preferably, short heat-pipes are used for this connection and the inclusion of additional heat energy carrying structure within to enhance heat transfer.

Fission reactor 14 is cooled both by the heat extraction and by direct convection of gas flow through the reactor. Exhaust nozzle 15 is used for discharging the hot gases to generate thrust. Pressurization line 16 is intended to maintain pressure in the primary propellant tank in an autogenous manner.

Figure 7:
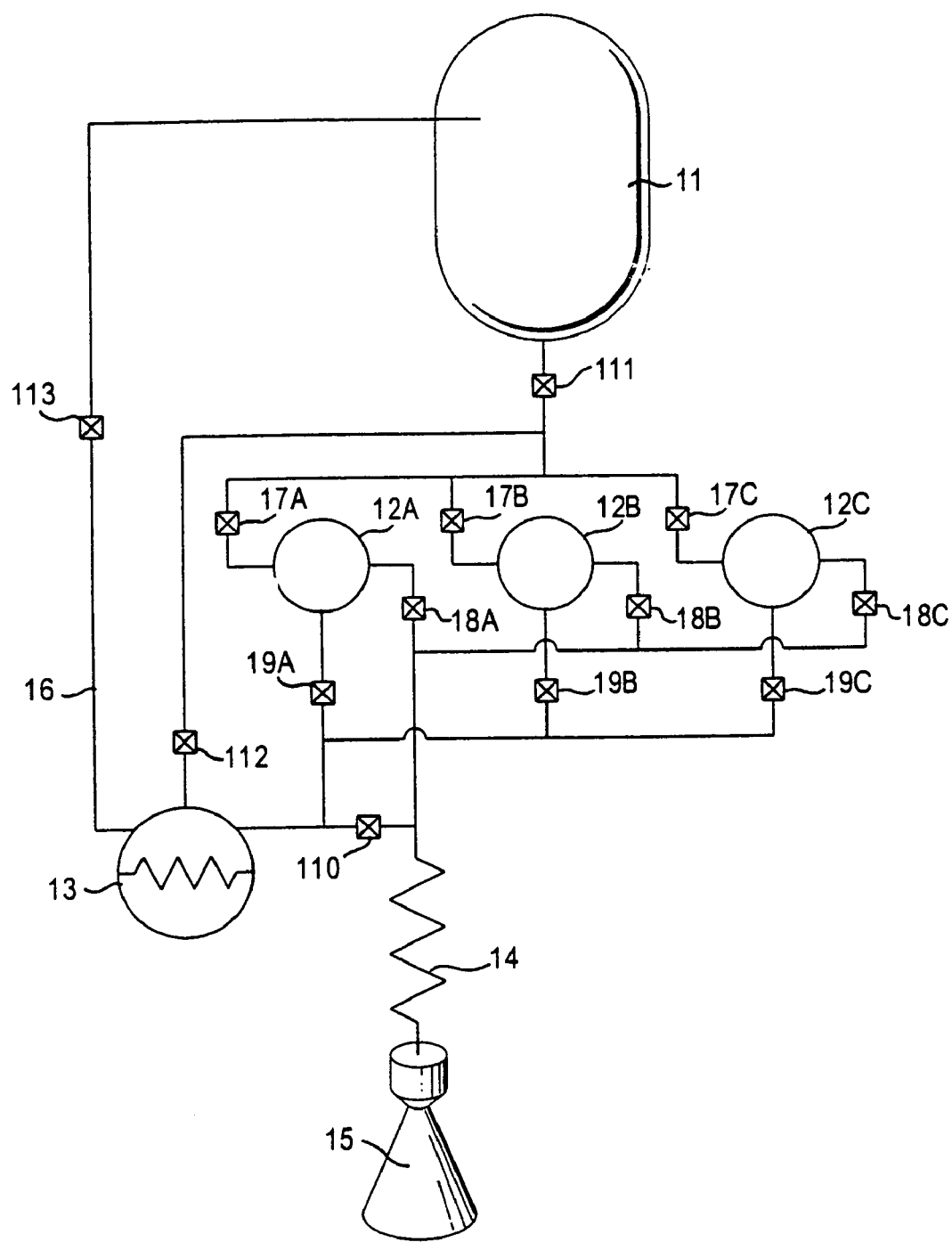
FIG. 7 is a schematic layout of the embodiment of FIG. 6.

FIG. 7 is a schematic layout of this second embodiment. This figure shows the same components laid out in schematic format with the addition of the on/off control valve 113. The three pressure balls are labeled 12A, 12B, and 12C as are their associated inlet valves 17A-C, outlet valves 18A-C, and pressurization valves 19A-C. Valve 112 is to be used to fill the boiler 13 from the propellant storage tank 11. Drain valve 110 is to be used to drain the boiler 13 once the burn is complete.

FIG. 7 shows the various locations of the associated inlet valves 17A-C, outlet valves 18A-C, and pressurization valves 19A-C in a schematic format. Specifically, upstream, i.e., toward the propellant tank 11, from each pressure ball 13A-C is a pressure valve 17A-C, and downstream is positioned an outlet valve 18A-C. In contrast to the first embodiment described above. FIGS. 8, 9, 10 and 11 show the various operational phases. These four figures show how the system operates.

Figure 8:
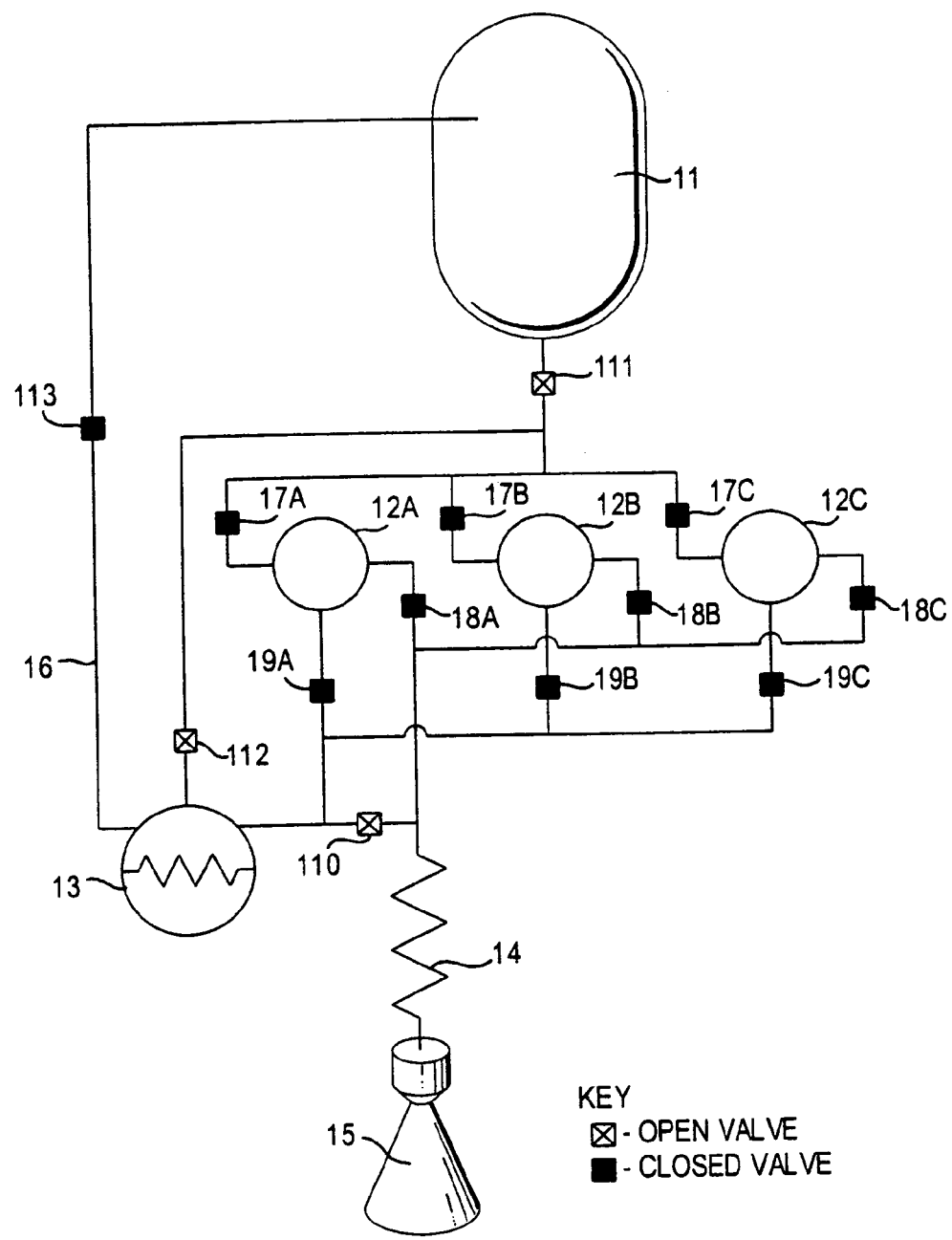
FIG. 8 is a schematic of operational phase zero of the embodiment of FIG. 6.

FIG. 8 is a schematic of operational phase zero of the embodiment of FIG. 6. FIG. 8 shows the operation of filling the boiler 13 from the primary propellant tank 11. FIG. 8 shows valves 113, 17A-C, 18 A-C, and 19 A-C closed. Valves 112, 111 and 110 are open.

Figure 9:
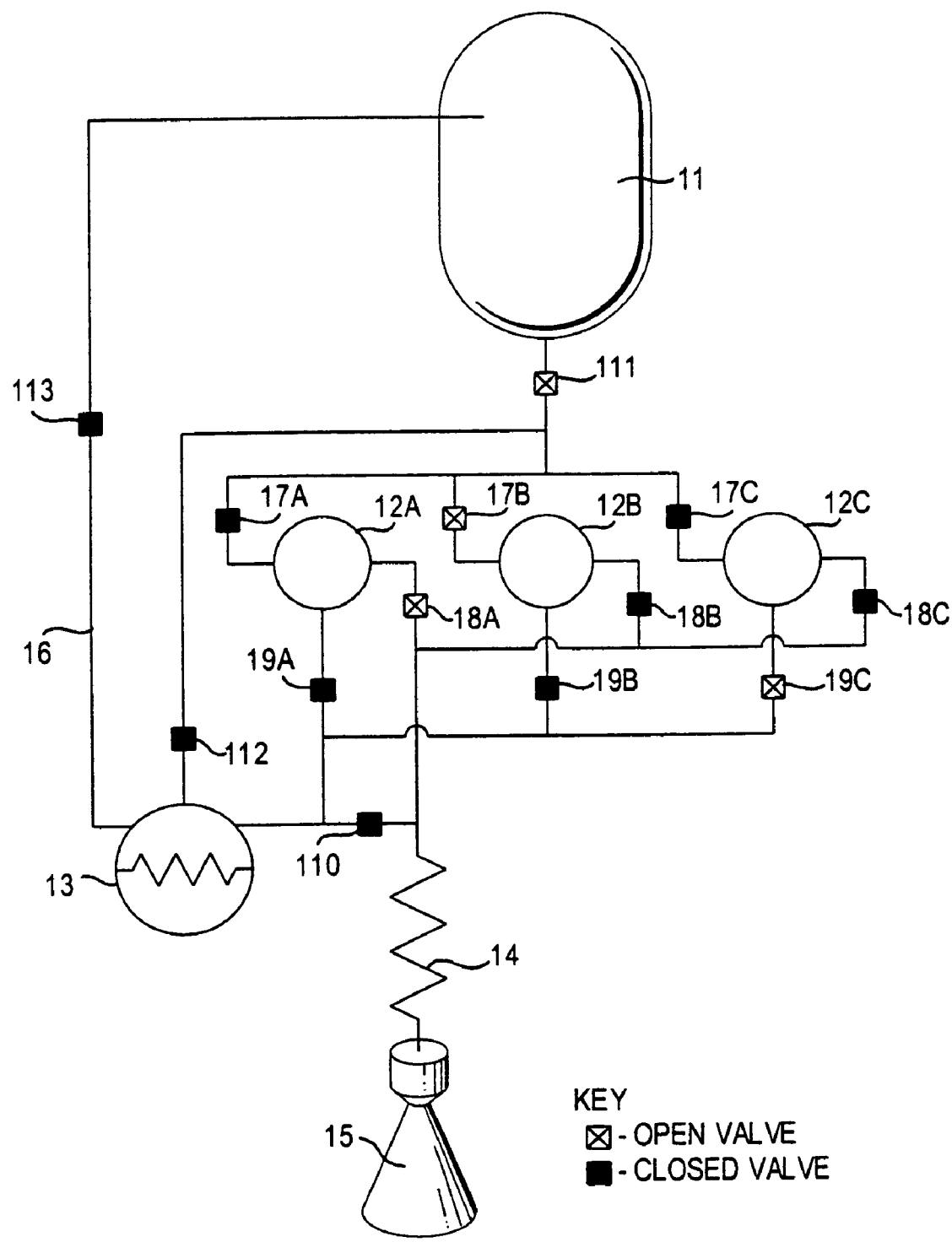
FIG. 9 is a schematic of a first operational phase of the embodiment of FIG. 6.
Figure 10:
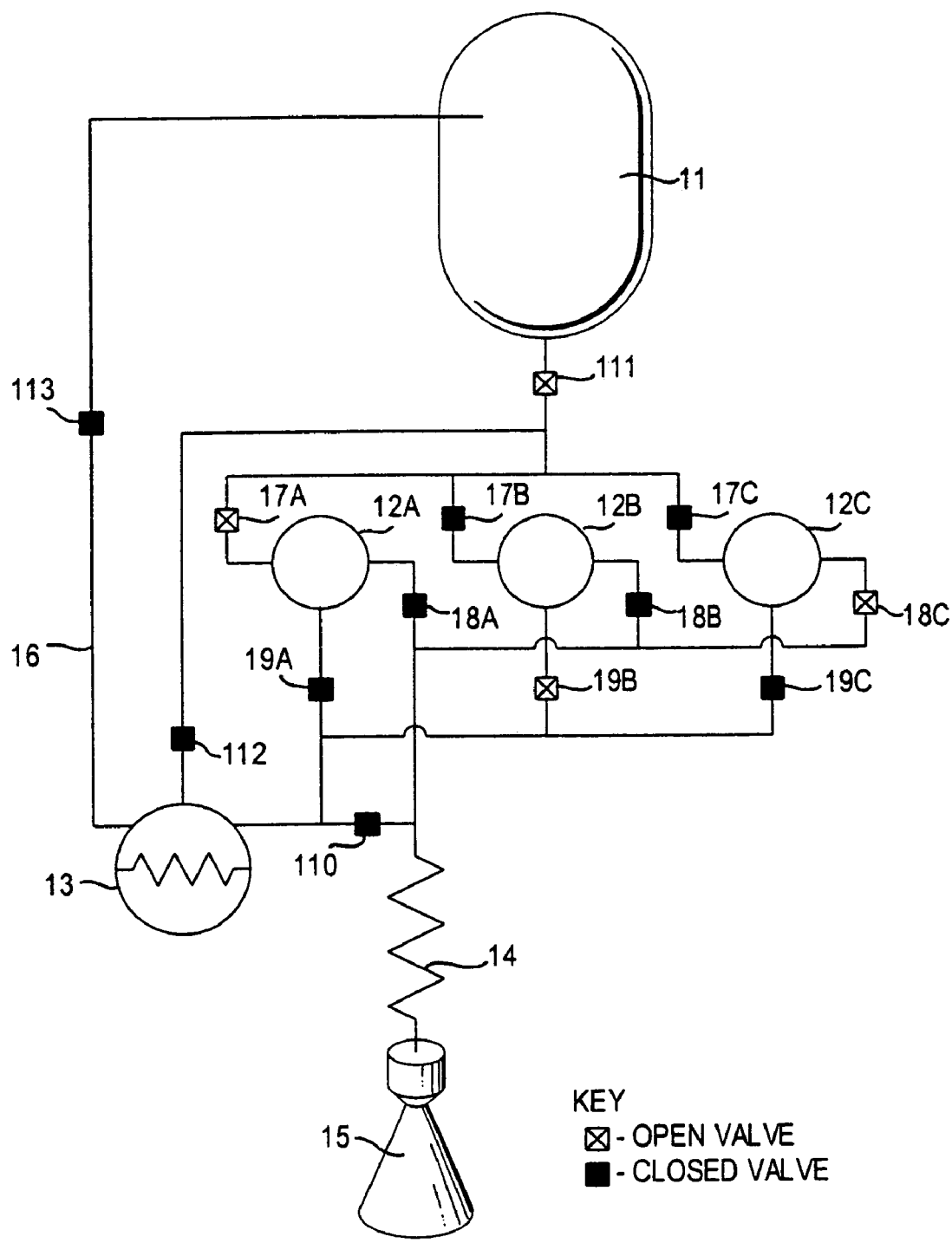
FIG. 10 is a schematic of a second operational phase of the embodiment of FIG. 6.
Figure 11:
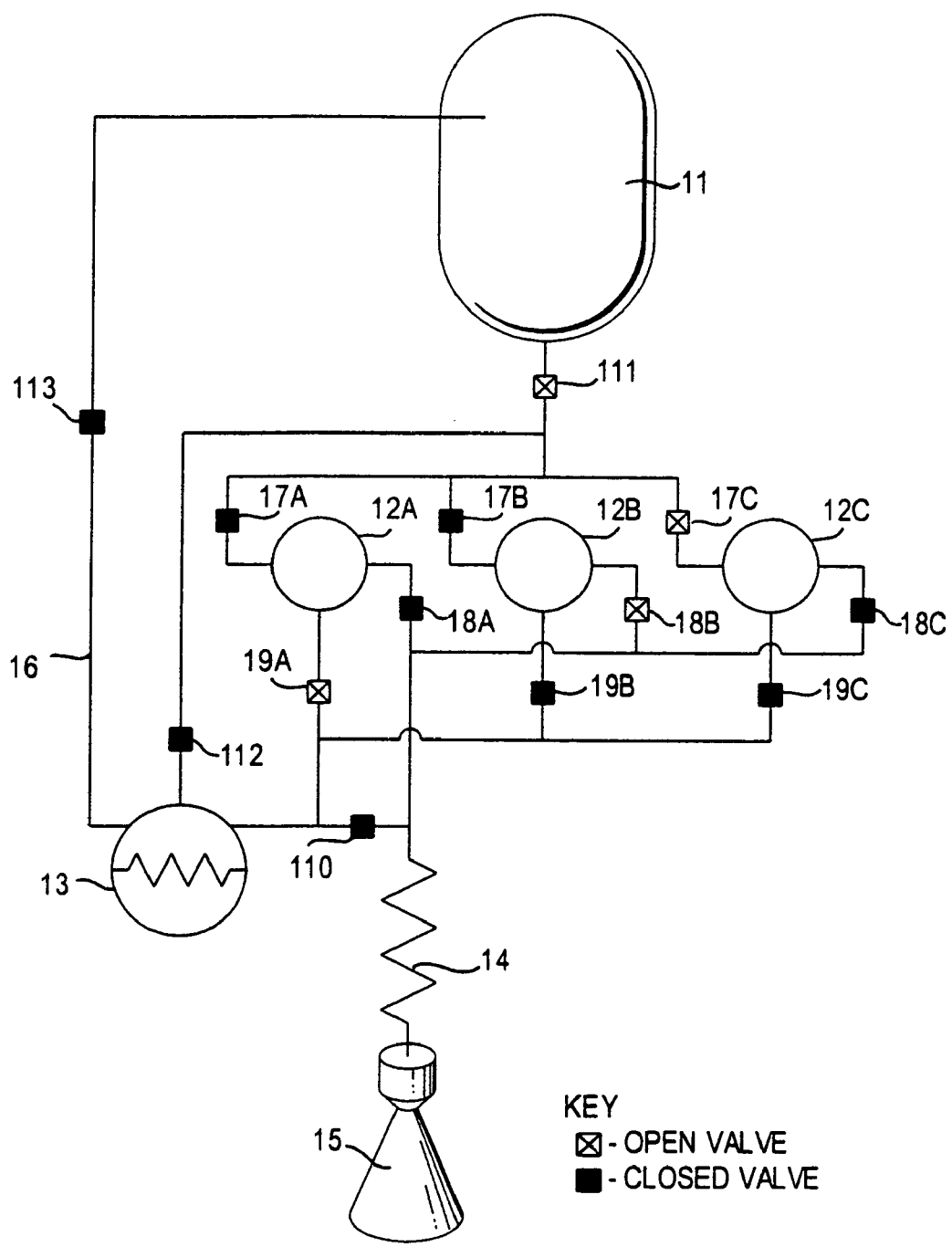
FIG. 11 is a schematic of a third operational phase of the embodiment of FIG. 6.

FIGS. 9, 10 and 11 show how the system operates in a cyclical manner to achieve an effective pumping action via the use of pressurization fluid generated within the boiler.

FIG. 9 is a schematic of a first operational phase of the embodiment of FIG. 6. FIG. 9 shows valves 113, 112, 110, 17A,C, 18B,C, 19A,B closed. Valves 111, 17B, 18A and 19C are open. Thus, the propellant exiting pressure ball 12A is used for the generation of thrust.

FIG. 10 is a schematic of a second operational phase of the embodiment of FIG. 6. FIG. 10 shows valves 113, 112, 110, 17B,C, 18A,B 19A,C closed. Valves 111, 17A, 18C and 19B are open. Thus, the propellant exiting pressure ball 12C is used for the generation of thrust.

FIG. 11 is a schematic of a third operational phase of the embodiment of FIG. 6. FIG. 11 shows valves 113, 112, 110, 17A,B, 18A,C, 19B,C closed. Valves 111, 17C, 18B and 19A are open. Thus, the propellant exiting pressure ball 12B is used for the generation of thrust.

The final action of the propellant fluid discharged from one of the three pressure balls 12 is to pass through the reactor core to gain a significant quantity of heat. This thermal energy is then transformed into kinetic energy and thrust via the exhaust nozzle 15.

Further, through all phases of operation, the valve in the autogenous pressurization line 13 is modulated to maintain the proper low pressure in the primary propellant tank. A boiler relief valve 110 is included for safety purposes to dump excess pressurant through the reactor 14 and nozzle 15.

It should be apparent that embodiments other than those specifically described above may come within the spirit and scope of the present invention. Hence, the present invention is not limited by the above description but rather is defined by the claims appended hereto.

I claim:

1. An apparatus for a thermal rocket engine cycle, comprising:
    a propellant tank;
    a plurality of pressure balls for receiving fluid propellant discharged from the propellant tank,
    each of said plurality of pressure balls in fluid communication with said propellant tank;
    means for heating and thereby pressurizing the propellant prior to discharging the propellant from the respective pressure ball, connected to said plurality of pressure balls;
    a pressurization line for recycling to the propellant tank a heated portion of the propellant to maintain pressure in said propellant tank;
    means for heating the propellant discharged from the pressure balls; and
    an exhaust nozzle for discharging propellant from said means for heating the propellant discharged from the pressure balls, to create thrust;
    wherein each of said plurality of pressure balls is provided with an inlet valve for passing therethrough propellant before entering the respective pressure ball and an outlet valve for passing therethrough propellant after discharging from the respective pressure ball, such that operation of the inlet valve and outlet valve, combined with the heating of the propellants in the pressure balls achieves a pumping action of propellant fluid.

2. The apparatus for a thermal rocket engine cycle of claim 1, further comprising a boiler, positioned between said propellant tank and said pressure balls and each of said plurality of pressure balls is provided with a pressurization valve along a respective conduit connecting the boiler to the respective pressure ball for directing the propellant heated in the boiler from the boiler to the respective of pressure ball,
    whereby manipulation of pressure ball inlet, outlet, and pressurization valves creates pumping action.

3. The apparatus for a thermal rocket engine cycle of claim 2, further comprising:
    a fill valve for filling said boiler from said propellant tank; and
    a drain valve for draining said boiler.

4. The apparatus of claim 1, wherein the pressurization line comprises a modulator, positioned to maintain a desired pressure in the propellant tank.

5. The apparatus of claim 1, wherein the apparatus has a lack of a separate pressurization fluid for feeding the propellant through the engine cycle and a lack of turbomachinery for feeding the propellant through the engine cycle.

6. A method for cycling a thermal rocket engine comprising:
- discharging a fluid propellant from a propellant tank;
- passing the propellant discharged from the propellant tank to a plurality of pressure balls in fluid communication with the propellant tank;
- discharging the propellant from the pressure balls;
- heating and thereby pressurizing the propellant prior to discharging the propellant from the respective pressure ball;
- recycling to the propellant tank through a pressurization line a heated portion of the propellant to maintain pressure in the propellant tank; heating the propellant discharged from the pressure balls; and
- discharging from an exhaust nozzle the propellant, heated after discharge from the pressure balls, to create thrust;
- each of said plurality of pressure balls having an inlet valve through which propellant passes before entering the respective pressure ball and an outlet valve through which propellant passes after discharging from the respective pressure ball,
- operating the inlet valve and outlet valve, combined with the heating of the propellants in the pressure balls, to achieve a pumping action of the propellant.

7. The apparatus of claim 1, wherein the plurality of pressure balls comprises three pressure balls, each of said pressure balls in fluid communication with said propellant tank.

8. The method of claim 6 wherein the plurality of pressure balls comprises three pressure balls, each of said pressure balls in fluid communication with said propellant tank.

9. The apparatus of claim 1, comprising a fission reactor for supplying heat to the means for heating the propellant, discharged from the propellant tank, prior to discharging the propellant from the respective pressure ball.

10. The apparatus of claim 1, comprising a solar thermal system for supplying heat to the means for heating the propellant, discharged from the propellant tank, prior to discharging the propellant from the respective pressure ball.

11. The method of claim 6, comprising a fission reactor for supplying heat to the means for heating the propellant discharged from the pressure balls.

12. The method of claim 6, comprising a solar thermal system for supplying heat to the means for heating the propellant discharged from the pressure balls.

13. The method of claim 6,
- wherein one said pressure ball is discharging propellant to a heat source and then through the nozzle;
- while a second said pressure ball is being filled with propellant from the propellant tank;
- while heating propellant in a third said pressure ball to pressurize the propellant in the third pressure ball, prior to discharging the propellant from the third pressure ball.

* * * * *